United States Patent [19]

Kitagishi

[11] 4,420,226

[45] Dec. 13, 1983

[54] ZOOM LENS OF SHORT TOTAL LENGTH

[75] Inventor: Nozomu Kitagishi, Kawasaki, Japan

[73] Assignee: Canon Kabushiki Kaisha, Tokyo, Japan

[21] Appl. No.: 218,940

[22] Filed: Dec. 22, 1980

[30] Foreign Application Priority Data

Dec. 28, 1979 [JP] Japan ................................ 54-171342

[51] Int. Cl.³ .............................................. G02B 7/04
[52] U.S. Cl. .................................. 350/427; 350/423; 350/463; 350/464
[58] Field of Search ................................. 350/427, 428

[56] References Cited

U.S. PATENT DOCUMENTS

Re. 28,591  11/1975  Nakamura ........................... 350/427
4,145,115   3/1979   Betensky ............................. 350/427
4,307,943  12/1981   Betensky et al. ................... 350/428

Primary Examiner—John K. Corbin
Assistant Examiner—P. M. Dzierzynski
Attorney, Agent, or Firm—Toren, McGeady and Stanger

[57] ABSTRACT

The disclosed zoom lens includes a first lens group of positive power movable for focusing, a second lens group of negative power movable for varying the focal length of the system, a third lens group of positive power movable for image shift compensation, and a fourth lens group of positive power stationary during focusing and zooming. The fourth lens group consists of front and rear assemblies of which the front comprises, from front to rear, a singlet of positive power convex toward the front and a meniscus doublet of forward convexity with its cemented surface convex toward the front, and the rear comprises a single of positive power and a meniscus doublet of forward concavity, and is characterized by fulfilling the following requirements:

$$0.65 < F_{I,II}/F_R < 0.71 \tag{1}$$

$$-0.45/F_R < \phi_{II} < 0.17/F_R \tag{2}$$

$$0.14 F_R < r_{R4} < 0.24 F_R \tag{3}$$

where
$F_R$: the focal length of the fourth component;
$F_{I,II}$: the focal length of the front assembly;
$\phi_{II}$: the refractive power of the doublet in the front assembly; and
$r_{R4}$: the radius of curvature of the cemented surface.

2 Claims, 60 Drawing Figures

SPHERICAL ABERRATION   ASTIGMATISM   DISTORTION(%)

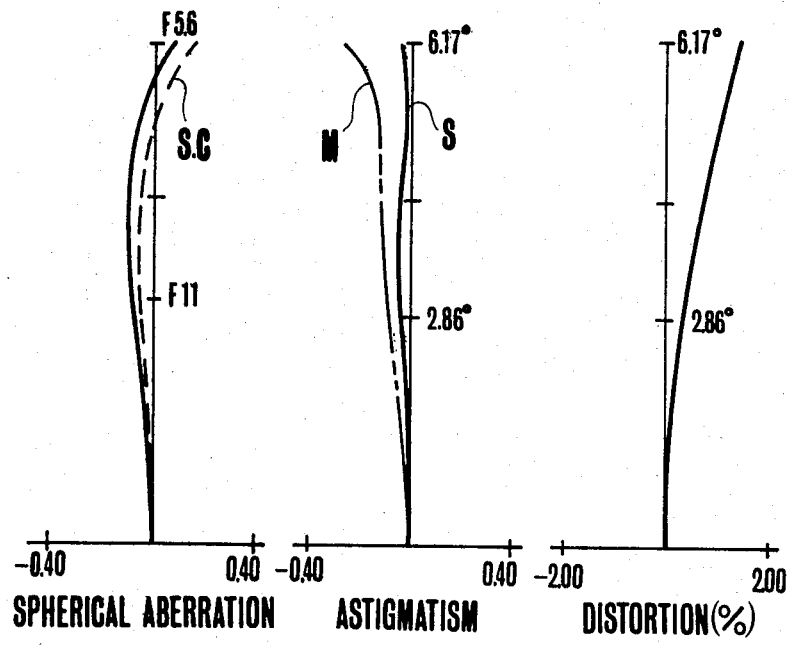
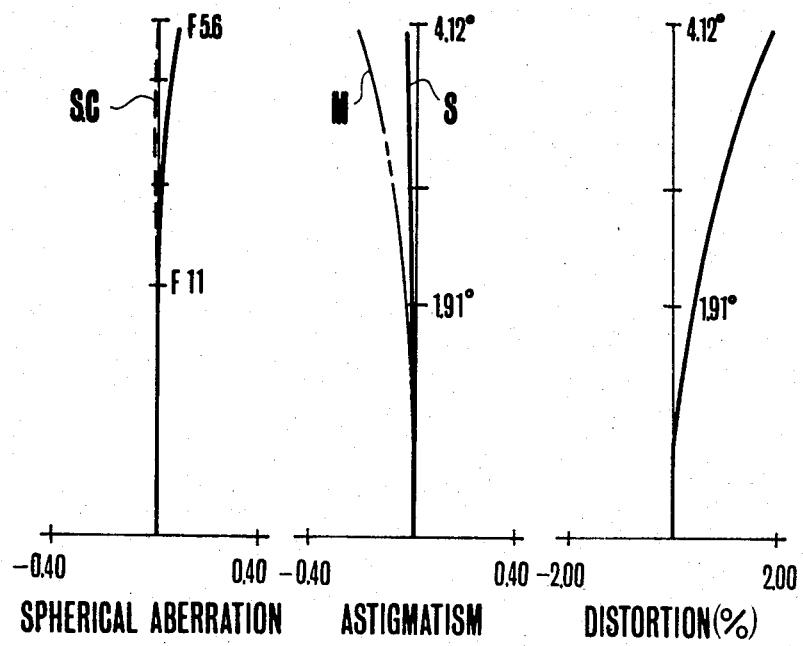

SPHERICAL ABERRATION   ASTIGMATISM   DISTORTION(%)

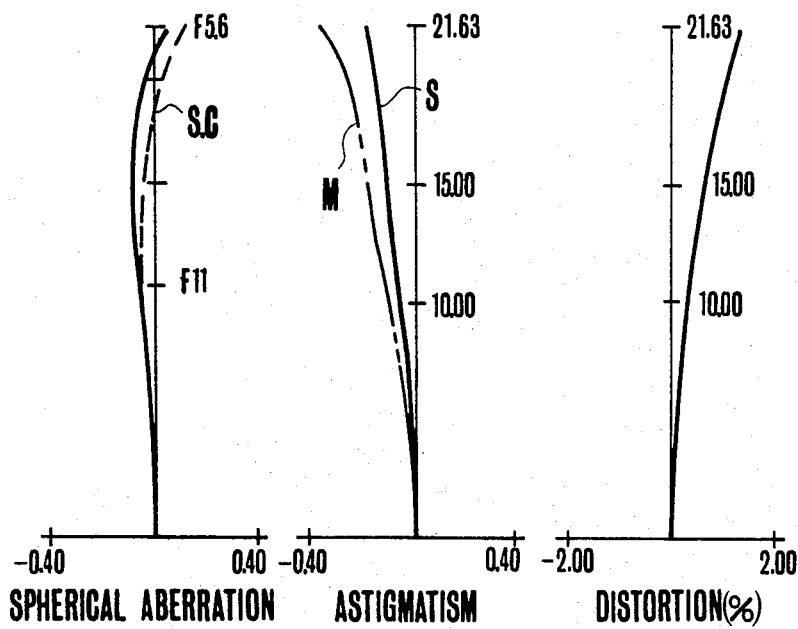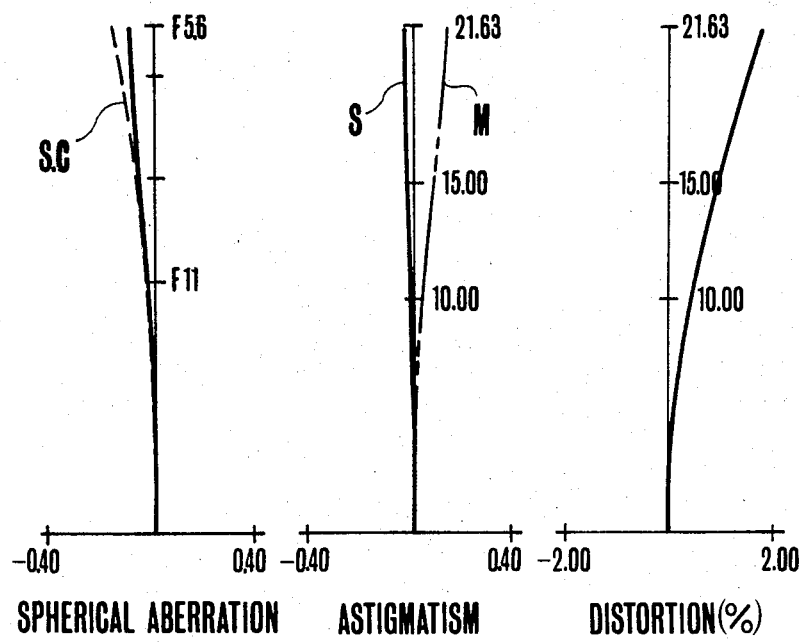

SPHERICAL ABERRATION  ASTIGMATISM  DISTORTION(%)

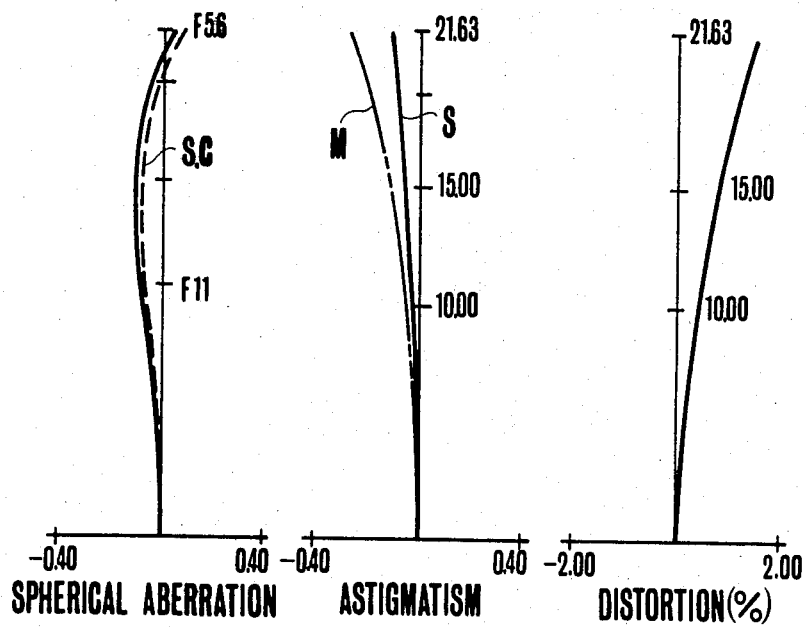
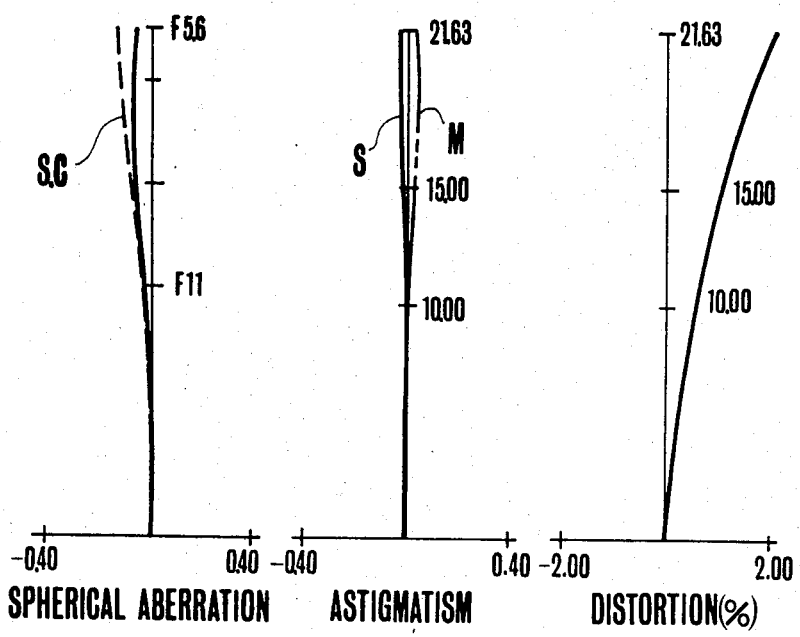

SPHERICAL ABERRATION  ASTIGMATISM  DISTORTION(%)

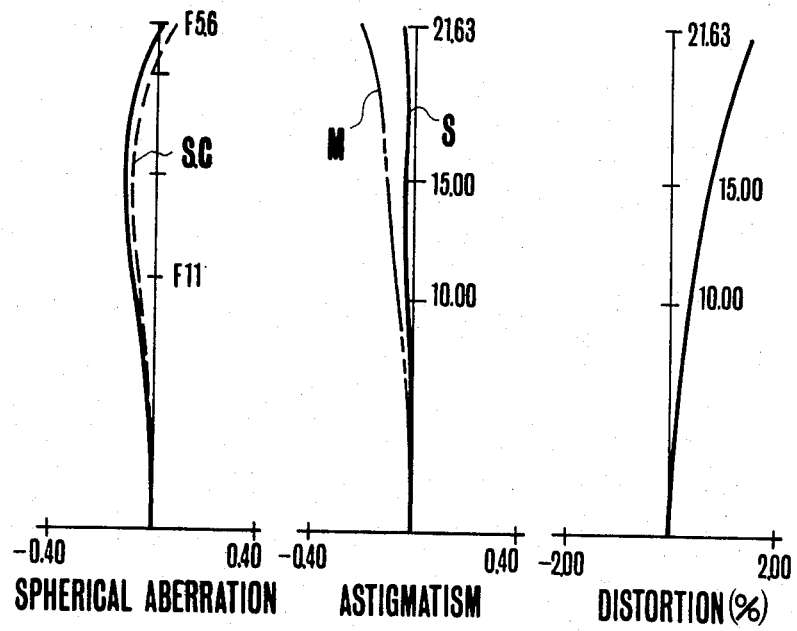
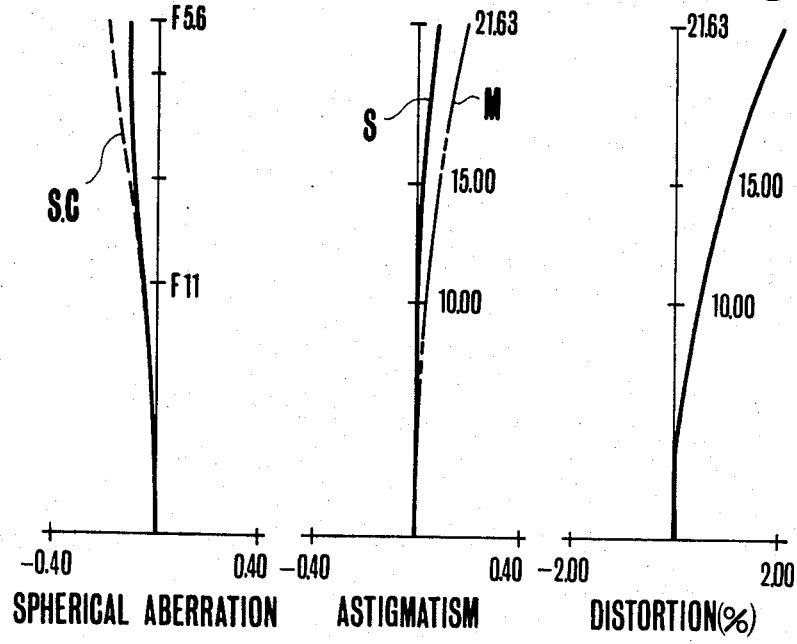

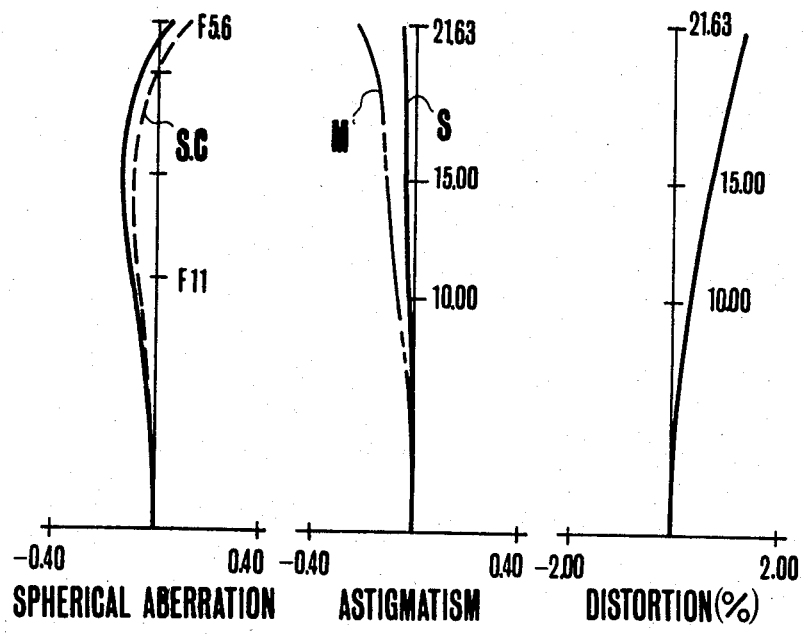
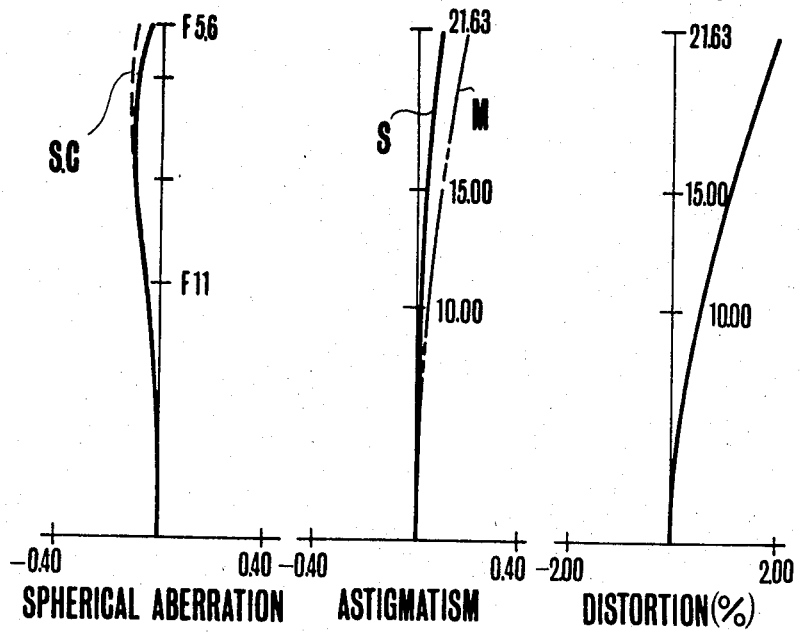

SPHERICAL ABERRATION   ASTIGMATISM   DISTORTION(%)

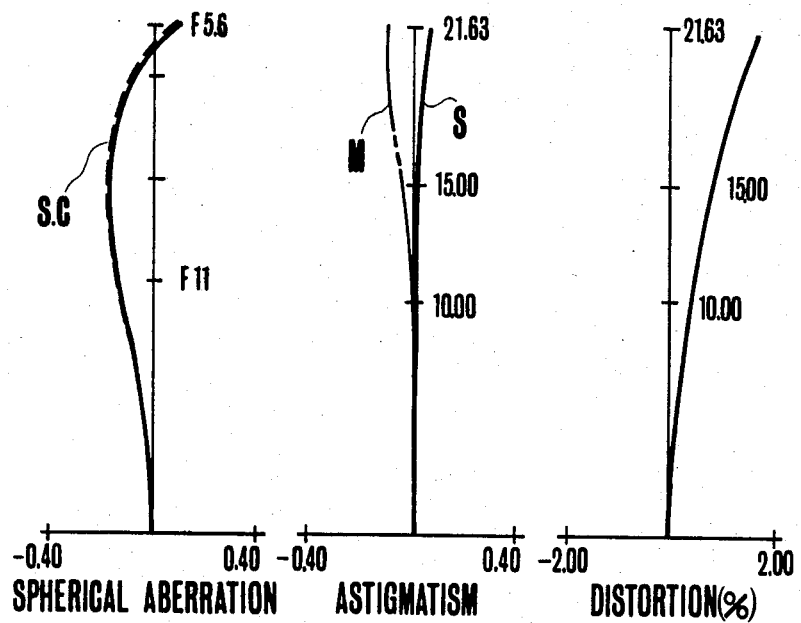
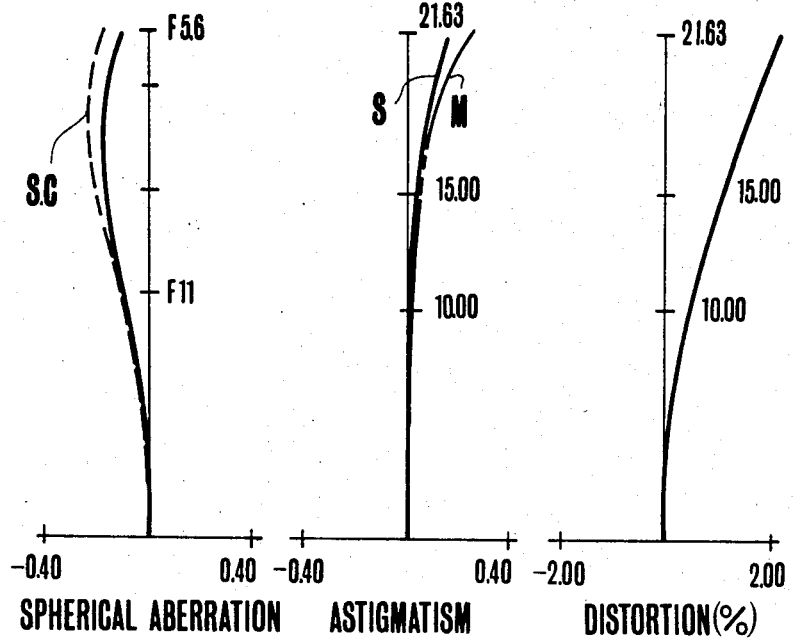

ZOOM LENS OF SHORT TOTAL LENGTH

BACKGROUND OF THE INVENTION

1. Field of the Invention

This invention relates to zoom lenses having a zoom ratio of more than three with a telephoto ratio (the total length of the lens system/its focal length) in the longest focal length position reduced to 0.8 or less, and more particularly to a relay lens in the form of the tele type to facilitate the shortening of the total length of the entire system.

2. Description of the Prior Art

In general, an increase in a zoom lens' zoom ratio and longest focal length extends its mechanical length and significantly diminishes its portability and manageability.

However, photographic lenses with medium to long focal lengths in the telephoto positions, when used in sports photography, animal, bird, and other wildlife photography, are handheld while shooting. Because this requires rapid and easy handling of the camera associated therewith, as well as of the lens, it is essential that the lens be compact.

A zoom lens having a wide range and constructed to shorten its total length is disclosed, for example, in Japanese Patent Application Publication No. Sho 49-24295. However, this lens is as slow as F/8.

An object of the present invention is to meet the aforementioned needs and to provide a zoom lens with high grade imaging performance and an increased zoom ratio while maintaining its compactness.

It is possible to shorten the total length of a zoom lens by: (1) Selecting a zoom type which facilitates shortening the total length as a whole; (2) Shortening the zoom section; and (3) Shortening the relay lens.

And, the present invention contemplates the use of, in particular, method (3), that is, of configuring the relay lens to be a strong tele type with the resultant distance from the front vertex of the relay lens to the focal plane of the complete lens being shortened, thus shortening the total length of the entire system. The employment of the tele type for use in the relay lens for shortening of the total length, gives rise to an alternate disadvantage that as the Petzval sum increases in the negative sense, extreme over-correction of field curvature results and the coma and astigmatism deteriorate. It is, therefore, an object of the present invention to provide a zoom lens having a greatly shortened total length while nevertheless preventing deterioration of the above-described aberrations. To achieve this, the relay lens is so configured and is characterized by satisfying the conditions in the claims, and as exemplified in the detail disclosure to follow.

BRIEF DESCRIPTION OF THE DRAWINGS

FIGS. 2(a) to (c), 3(a) to (c) and 4(a) to (c) are graphic representations of the various aberrations of the zoom lens of FIG. 1 when in the wide angle, middle and telephoto settings respectively.

FIGS. 6(a) to (c), 7(a) to (c) and 8(a) to (c) are graphic representations of the aberrations of the lens of FIG. 5 in the wide angle, middle and telephoto settings respectively.

FIGS. 10(a) to (c), 11(a) to (c) and 12(a) to (c) are graphic representations of the aberrations of the lens of FIG. 9 in the wide angle, middle and telephoto settings respectively.

FIGS. 14(a) to (c), 15(a) to (c) and 16(a) to (c) are graphic representations of the aberrations of the lens of FIG. 13 in the wide angle, middle and telephoto settings respectively.

FIGS. 18(a) to (c), 19(a) to (c) and 20(a) to (c) are graphic representations of the aberrations of the lens of FIG. 17 in the wide angle, middle and telephoto settings respectively.

FIGS. 22(a) to (c), 23(a) to (c) and 24(a) to (c) are graphic representations of the aberrations of the lens of FIG. 21 in the wide angle, middle and telephoto settings respectively.

DETAILED DESCRIPTION OF THE PREFERRED EMBODIMENTS

Figure 1:
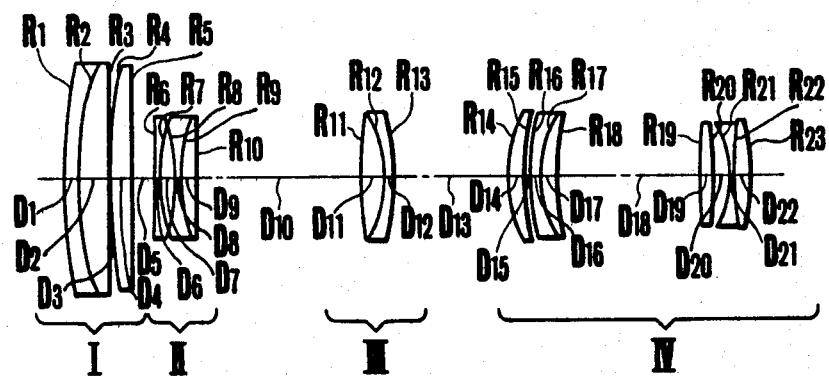
FIG. 1 is a lens diagram of Example 1 embodying the invention.
Figures 2A, 2B, 2C:
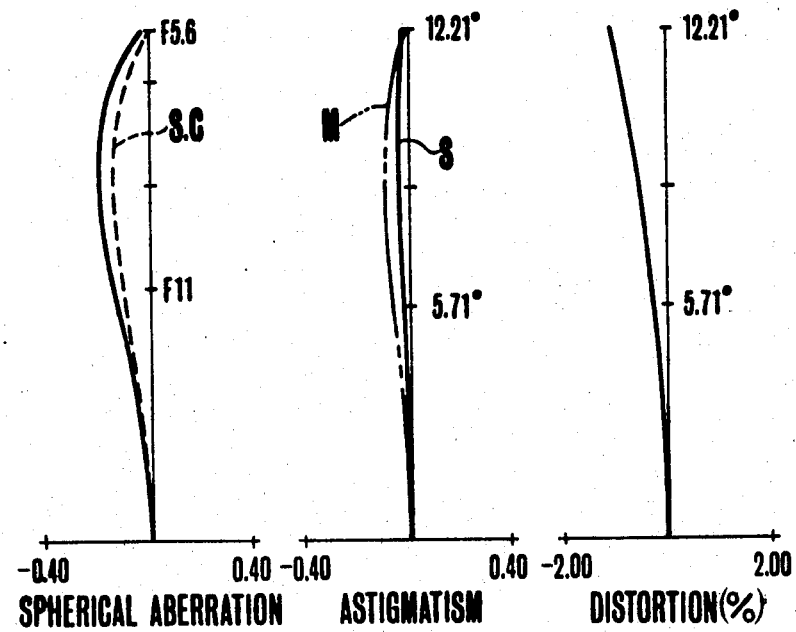
Figure 5:
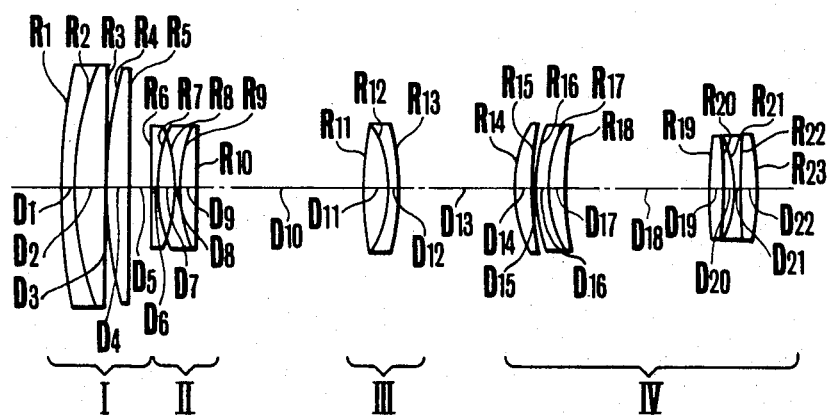
FIG. 5 is a lens diagram of Example 2 of the invention.
Figures 6A, 6B, 6C:
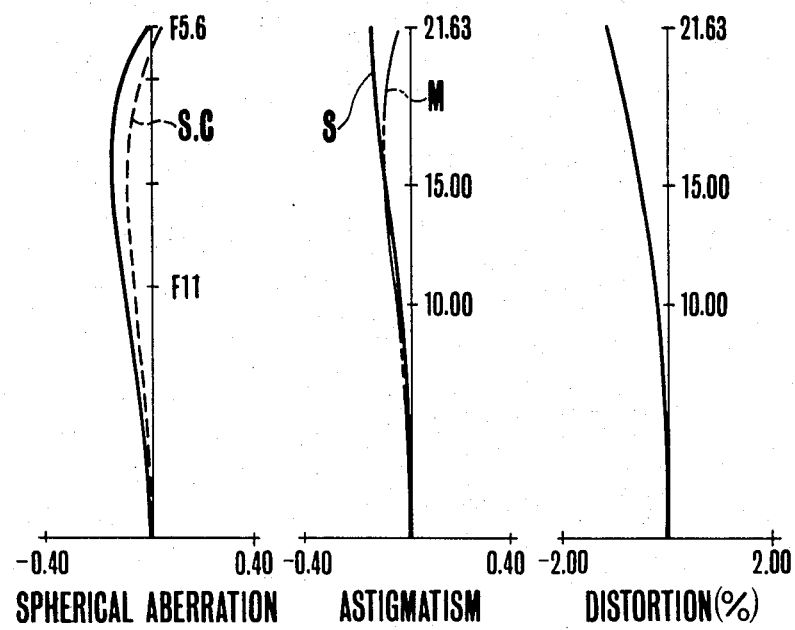
Figure 9:
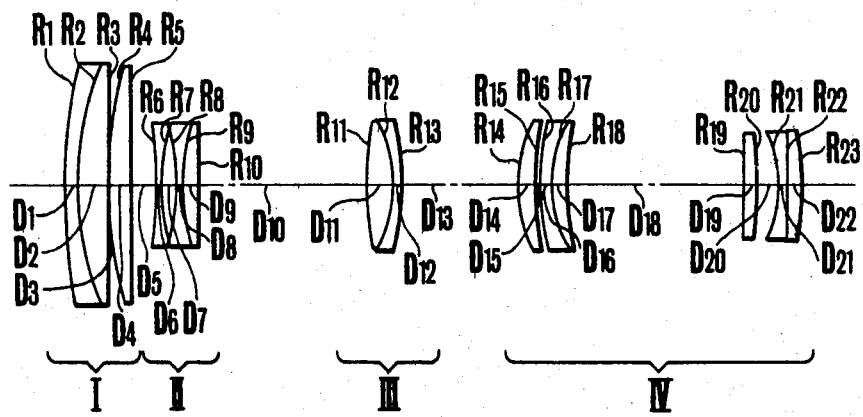
FIG. 9 is a lens block diagram of Example 3 the invention.
Figures 10A, 10B, 10C:
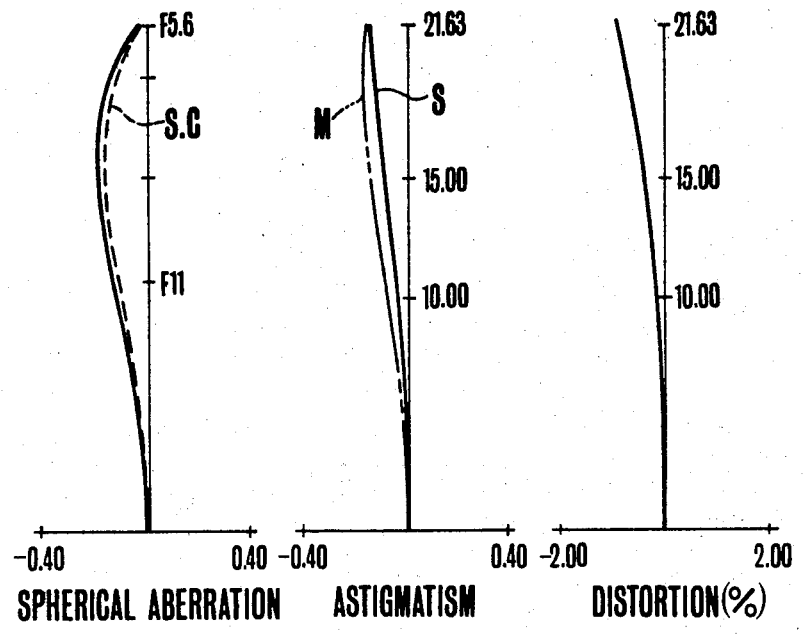
Figure 13:
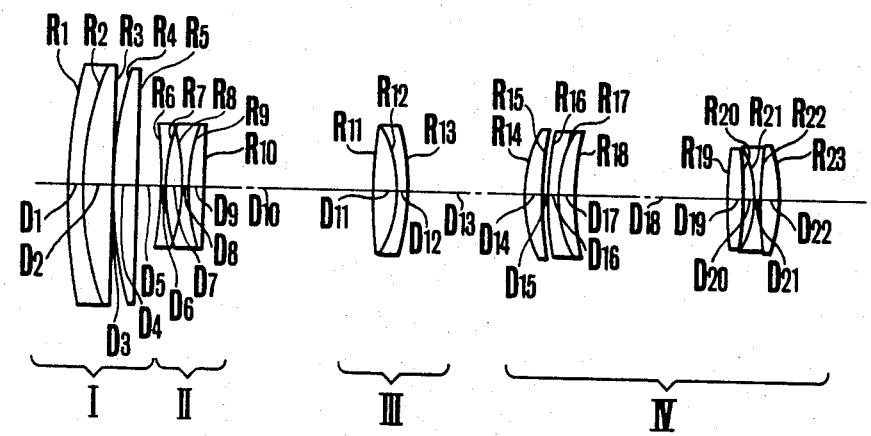
FIG. 13 is a lens diagram of Example 4 embodying the invention.
Figures 14A, 14B, 14C:
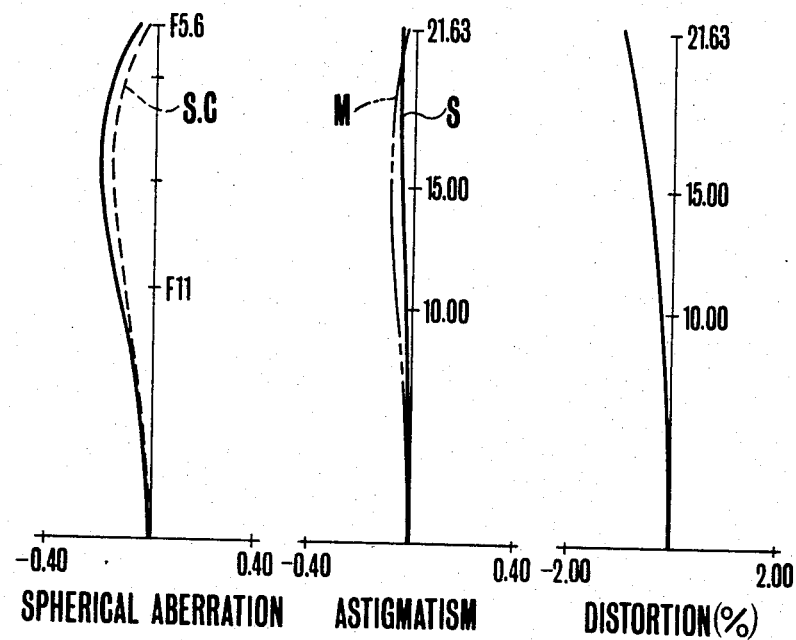
Figure 17:
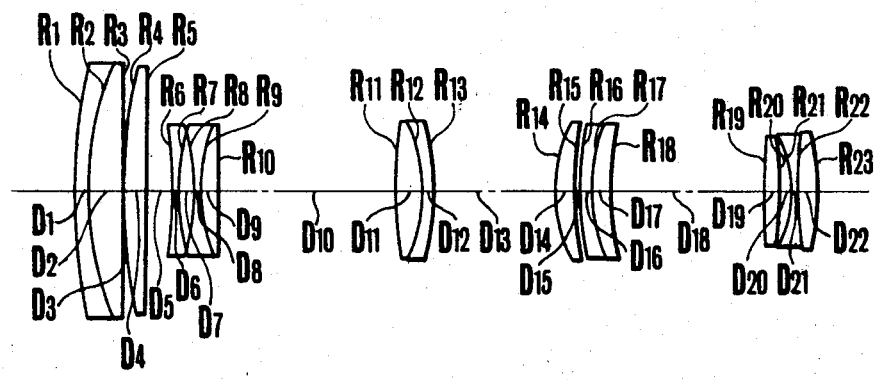
FIG. 17 is a lens diagram of Example 5 embodying the invention.
Figures 18A, 18B, 18C:
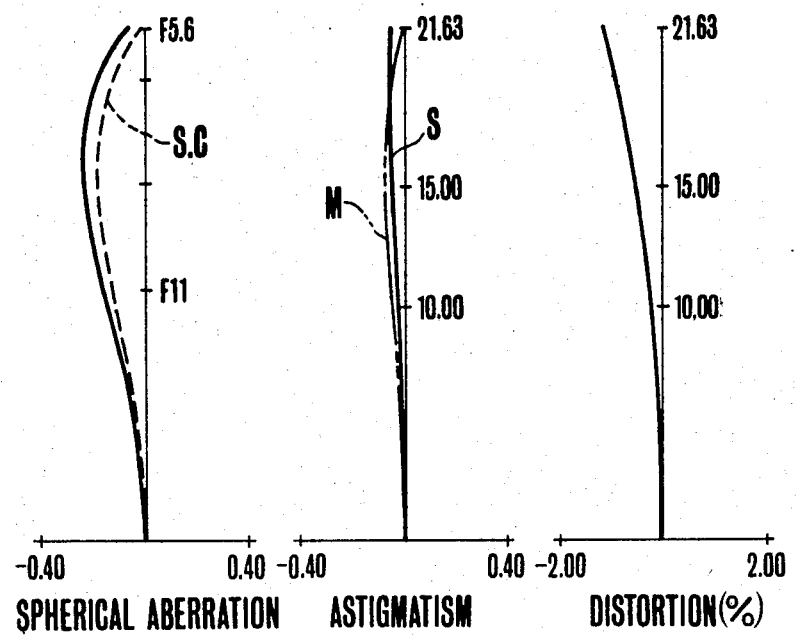
Figure 21:
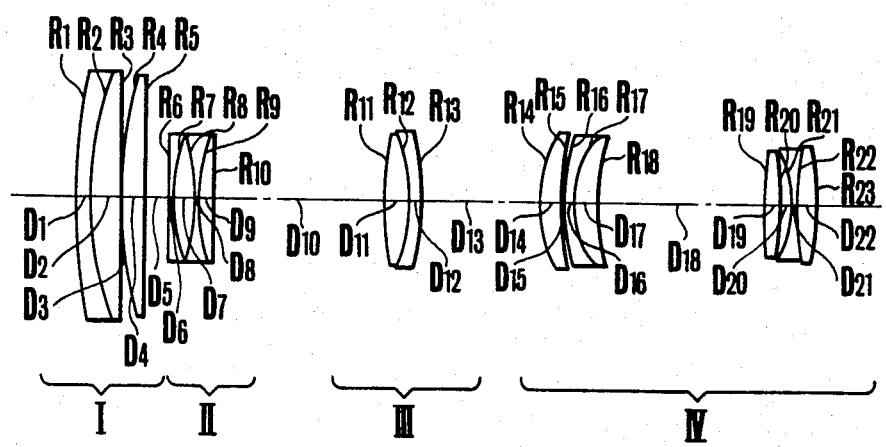
FIG. 21 is a lens diagram of Example 6 embodying the invention.
Figures 22A, 22B, 22C:
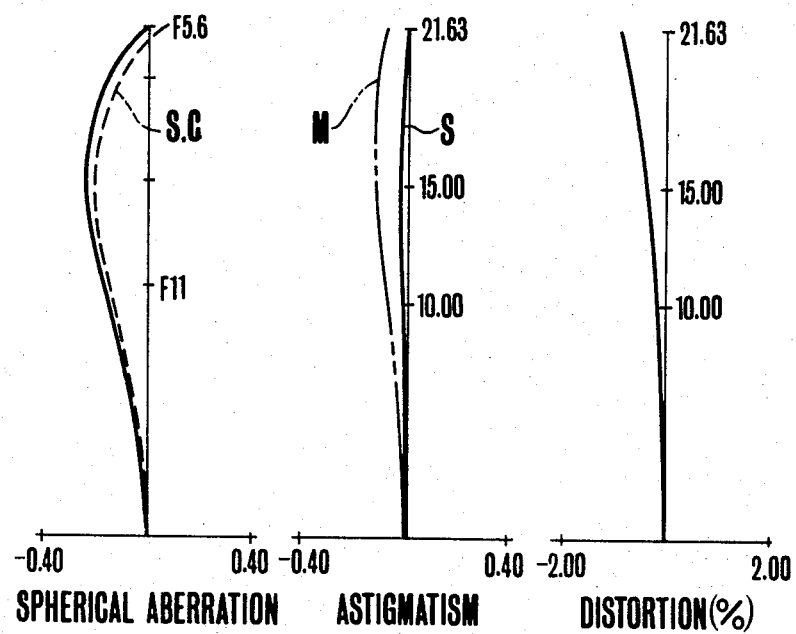

The zoom lens of the present invention has as its general configuration an almost afocal section consisting of a convergent first lens group I axially movable for focusing, a divergent second lens group II axially movable for zooming, and a convergent third lens group II axially movable for the image shift compensation followed by an image forming rear lens group or fourth lens group IV which is stationary during zooming.

The convergent rear lens group IV comprises, from front to rear, first lens component consisting of a positive singlet with its front surface of strong curvature convex toward the front, a second lens component consisting of a meniscus doublet of forward convexity positioned adjacent the first component and having a weak refractive power with its cemented surface convex toward the front, a third lens component consisting of a positive singlet positioned in a large air separation from the above-described second component, and a fourth lens component consisting of a meniscus doublet of forward concavity positioned adjacent the third component, said rear section satisfying at least one of the following conditions:

$$0.65 < F_{I,II}/F_R < 0.71 \tag{1}$$

$$-0.45/F_R < a_{II} < 0.17/F_R \tag{2}$$

$$0.14 F_r < r_{R4} < 0.24 F_R \tag{3}$$

where $F_R$ is the focal length of the rear section;

$F_{I,II}$ is the overall focal length of the first and second components in the rear lens group;

$a_{II}$ is the refractive power of the second component in the rear lens group; and $r_{R4}$ is the radius of curvature of the cemented surface in the second component in the rear lens group.

In order to obtain a zoom lens which is better corrected for the aberrations, it is preferable to satisfy the following additional conditions:

$$0.15 < n_{R2} - n_{R3} < 0.26 \quad (4)$$

$$1.5 < n_{R1} - 1.65; \quad 1.5 < n_{R4} < 1.65 \quad (5)$$

where $n_{Ri}$ is the index of refraction of the material of the i-th lens element counting from the front in the rear section.

Details of the above-described construction and each of the conditions follow. Condition (1) serves to shorten the distance from the front vertex of the 4th lens group to the focal plane of the entire system. The front assembly of the rear section (which consists of the first and second components) includes a strong positive lens group having a focal length equal to 0.65 to 0.71 times the focal length of the fourth lens group. Thus, the relay lens is configured into an extremely strong tele type lens. It is noted here that in the practical embodiments of the invention to be described later, the rear assembly (which consists of the third and fourth components of the fourth lens group) includes a negative lens group in which the absolute focal length is equal to 0.93 to 1.18 times the focal length of the fourth lens group with a large air separation from the front assembly. As a result of setting forth the condition for the strong tele type relay lens it is possible to provide the zoom lens of the invention with a relay section of a shorter overall length. When the focal length of the front group of the relay lens is longer than the upper limit of condition (1), the total length of the complete zoom lens cannot be greatly shortened. When the lower limit is exceeded, the total length can be advantageously shortened, but it becomes difficult to compensate for the over-corrected field curvature even when conditions (2) to (5) are satisfied. Correction of astigmatism and coma also becomes difficult.

Conditions (2) to (5) are to correct the aberrations in the strong tele type relay lens. When the refractive power of the second component of the fourth lens group is stronger than the upper limit of condition (2), though the total length is shortened, spherical aberration is under-corrected and this cannot be compensated for. When the refractive power of the second component of the fourth lens group is stronger in negative sense than the lower limit, the overall refractive power of the front assembly of the relay lens becomes so weak that shortening of the total length is no longer achieved.

In addition to the weak refractive power mentioned above, the second component of the fourth lens group is then provided with a cemented surface convex toward the front and exhibits the strong curvature defined in condition (3) and, more preferably, possesses the refractive index difference in the lens elements on the both sides of the cemented surface defined by condition (4) to correct for field curvature while preventing the other aberration from deteriorating. And, the configuration of the cemented surface to the forward convexity which constitutes one of the features of the invention serves to prevent the converging rays of light incident upon the cemented surface from being steeply refracted. Hence, the lateral aberration produced by that surface is minimized.

When the radius of curvature of the cemented surface in the second component of the fourth lens group is smaller than the lower limit of condition (3), the over-corrected field curvature can be advantageously compensated for, but instead the higher order spherical aberration and coma, in particular, that portion of the coma which is ascribable to the marginal rays of light in relation to the center of the area of diaphragm aperture, are increased objectionably. On the other hand, when the radius of curvature of the cemented surface in the second component of the fourth lens group is larger than the upper limit of condition (3), it becomes impossible to compensate for the over-corrected field curvature.

Inequality (4) provides a similar condition to that of inequality (3) in that the over-corrected field curvature is compensated for. It should be pointed out that the zoom lens of the invention includes the second component of the fourth lens group in the form of the cemented lens with the main aim of improving of field curvature. That is, the Petzval sum which would be otherwise increased in the negative sense is intended to assume a minimum value.

If the second component of the fourth lens group lacks the cemented surface, or if the doublet in the embodiment to be described later were replaced by a singlet having a refractive index equal to the mean refractive index of the doublet, the Petzval sum would reach a value as large as $-0.11$. In contrast, the introduction of the cemented surface defined by conditions (3) and (4) into the second component of the fourth lens group as in the embodiment of the invention results in the reduction of the Petzval sum to a value as small as $-0.033$. It will be appreciated that the residual curvature of field is well corrected for. When the lower limit of inequality (4) is exceeded, it becomes difficult to compensate for the over-corrected curvature of field. On the other hand, when the upper limit is exceeded, higher order spherical aberrations are produced.

Inequality (5) represents a condition for compensation of spherical aberration and curvature of field. That is, when the lower limit is exceeded, it becomes difficult to achieve the compensation for the spherical aberration. When the upper limit is exceeded, the satisfaction of the conditions defined by the inequalities (2), (3) and (4) does not lead to sufficient compensation for the over-corrected curvature of field.

According to the present invention, therefore, the total length of a zoom lens is remarkably shortened as compared to known zoom lenses of the same general configuration mentioned above by the use of the relay section of the strong tele type defined by inequality (1) and is well corrected for the Petzval sum and spherical aberration by satisfying at least one of the conditions (2) to (5) throughout the extended range of variation of the focal length. Thus, the present invention offers the advantage of providing a zoom lens of greatly extended range with remarkably shortened total length, and which lens is well corrected for high grade imaging performance over the entire zooming range.

According to a preferred embodiment of the invention, a number of examples of specific zoom lenses can be constructed as represented by the numerical values given in the following tables for the radii of curvature R, the lens thicknesses and air separations D, the Abbe numbers ν for the various lens elements, the corresponding indices of refraction Nd, spherical aberration coefficients SA, coma coefficients CM, astigmatism coefficients AS, distortion coefficients DS and Petzval sums PT.

EXAMPLE 1

Focal Length f = 100.0–300.0  F-number = 5.6

| | No. | R | D | ν | Nd |
|---|---|---|---|---|---|
| I | 1 | 140.16742 | 2.94551 | 25.40 | 1.80518 |
| | 2 | 78.67826 | 6.87285 | 61.10 | 1.58913 |
| | 3 | 2853.54186 | 0.19637 | | 1. |
| | 4 | 110.47110 | 4.90918 | 64.10 | 1.51633 |
| | 5 | 59522.08270 | $l_1 = 5.44206$ | | 1. |
| II | 6 | −630.23264 | 1.47275 | 55.50 | 1.69680 |
| | 7 | 49.94571 | 3.16932 | | 1. |
| | 8 | −54.81991 | 1.47275 | 55.50 | 1.69680 |
| | 9 | 46.44924 | 3.52589 | 25.40 | 1.80518 |
| | 10 | −2089.27067 | $l_2 = 37.84449$ | | 1. |
| III | 11 | 126.42425 | 5.36975 | 48.90 | 1.53172 |
| | 12 | −33.20077 | 2.35641 | 25.40 | 1.80518 |
| | 13 | −59.18780 | $l_3 = 26.71743$ | | 1. |
| IV | 14 | 34.70530 | 3.92734 | 56.40 | 1.61375 |
| | 15 | 80.51276 | 0.98184 | | 1. |
| | 16 | 57.98799 | 2.45459 | 25.40 | 1.80518 |
| | 17 | 28.40067 | 3.88796 | 35.30 | 1.59270 |
| | 18 | 68.61810 | 32.91106 | | 1. |
| | 19 | 143.28580 | 3.43643 | 60.70 | 1.60311 |
| | 20 | −117.87205 | 3.43434 | | 1. |
| | 21 | −28.89701 | 1.47275 | 46.60 | 1.77250 |
| | 22 | 227.15648 | 3.78320 | 33.80 | 1.64769 |
| | 23 | −59.28424 | | | |

| | f = 100 | f = 200 | f = 300 |
|---|---|---|---|
| $l_1$ | 5.4421 | 46.6792 | 60.4249 |
| $l_2$ | 37.8445 | 19.1428 | 0.4412 |
| $l_3$ | 26.7174 | 4.1820 | 9.1379 |

EXAMPLE 2

Focal Length f = 100.0–300.0  F-number = 5.6

| | No. | R | D | ν | Nd |
|---|---|---|---|---|---|
| 1 | 1 | 141.13770 | 3.00000 | 25.40 | 1.80518 |
| | 2 | 79.34557 | 7.00000 | 61.10 | 1.58913 |
| | 3 | 1904.02193 | 0.20000 | | 1. |
| | 4 | 109.96837 | 5.0000 | 64.10 | 1.51633 |
| | 5 | 10912.13579 | $l_1 = 5.37395$ | | 1. |
| 2 | 6 | −636.35662 | 1.50000 | 55.50 | 1.69680 |
| | 7 | 50.81062 | 3.37554 | | 1. |
| | 8 | −58.74273 | 1.50000 | 55.50 | 1.69680 |
| | 9 | 45.61285 | 3.59112 | 25.40 | 1.80518 |
| | 10 | 3405.77369 | $l_2 = 38.86141$ | | 1. |
| 3 | 11 | 112.88949 | 5.46909 | 48.90 | 1.53172 |
| | 12 | −34.85690 | 2.40000 | 25.40 | 1.80518 |
| | 13 | −64.13803 | $l_3 = 27.21170$ | | 1. |
| 4 | 14 | 34.17055 | 4.00000 | 56.80 | 1.51602 |
| | 15 | 91.21766 | 1.00000 | | 1. |
| | 16 | 56.94571 | 2.50000 | 25.40 | 1.80518 |
| | 17 | 28.62658 | 3.95989 | 35.30 | 1.59270 |
| | 18 | 71.95245 | 33.39907 | | 1. |
| | 19 | 148.09836 | 3.50000 | 60.10 | 1.64000 |
| | 20 | −115.55797 | 2.52290 | | 1. |
| | 21 | −30.00865 | 1.50000 | 49.60 | 1.77250 |
| | 22 | 256.81878 | 3.85319 | 33.80 | 1.64769 |
| | 23 | −65.38860 | | | |

| | f = 100 | f = 200 | f = 300 |
|---|---|---|---|
| $l_1$ | 5.3739 | 47.3739 | 61.3739 |
| $l_2$ | 38.8614 | 1.8138 | 0.7662 |
| $l_3$ | 27.2117 | 4.2593 | 9.3069 |

EXAMPLE 3

Focal Length f = 100–300  F-number = 5.6

| | No. | R | D | ν | Nd |
|---|---|---|---|---|---|
| 1 | 1 | 142.15007 | 3.00000 | 25.40 | 1.80518 |
| | 2 | 79.71789 | 7.00000 | 61.10 | 1.58913 |
| | 3 | 2606.38884 | 0.20000 | | 1. |
| | 4 | 112.27154 | 5.00000 | 64.10 | 1.51633 |
| | 5 | 97257.98252 | $l_1 = 5.44114$ | | 1. |
| 2 | 6 | −380.82601 | 1.50000 | 55.50 | 1.69680 |
| | 7 | 53.09704 | 3.25966 | | 1. |
| | 8 | −62.61641 | 1.50000 | 55.50 | 1.69680 |
| | 9 | 44.13338 | 3.59112 | 25.40 | 1.80518 |
| | 10 | 927.22035 | $l_2 = 38.76849$ | | 1. |
| 3 | 11 | 122.46558 | 5.46909 | 48.90 | 1.53172 |
| | 12 | −34.69593 | 2.40000 | 25.40 | 1.80518 |
| | 13 | −62.17982 | $l_3 = 27.21170$ | | 1. |
| 4 | 14 | 37.00682 | 4.00000 | 56.40 | 1.50137 |
| | 15 | 82.21954 | 1.00000 | | 1. |
| | 16 | 53.52816 | 2.50000 | 25.40 | 1.80518 |
| | 17 | 25.97685 | 3.95989 | 35.30 | 1.59270 |
| | 18 | 91.48706 | 40.55555 | | 1. |
| | 19 | 224.54666 | 3.50000 | 60.10 | 1.64000 |
| | 20 | −127.46254 | 4.91412 | | 1. |
| | 21 | −31.80175 | 1.50000 | 49.60 | 1.77250 |
| | 22 | 280.30976 | 3.85319 | 33.80 | 1.64796 |
| | 23 | −64.12158 | | | |

| | f = 100 | f = 200 | f = 300 |
|---|---|---|---|
| $l_1$ | 5.4411 | 47.4411 | 61.4411 |
| $l_2$ | 38.7685 | 19.7209 | 0.6732 |
| $l_3$ | 27.2117 | 4.2593 | 9.3069 |

EXAMPLE 4

Focal Length f = 100–300  F-number = 5.6

| | No. | R | D | ν | Nd |
|---|---|---|---|---|---|
| 1 | 1 | 141.09288 | 3.00000 | 25.40 | 1.80518 |
| | 2 | 79.38620 | 7.00000 | 61.10 | 1.58913 |
| | 3 | 1862.40677 | 0.20000 | | 1. |
| | 4 | 109.95322 | 5.00000 | 64.10 | 1.51633 |
| | 5 | 11688.75528 | $l_1 = 5.37170$ | | 1. |
| 2 | 6 | −659.48327 | 1.50000 | 55.50 | 1.69680 |
| | 7 | 50.75848 | 3.39374 | | 1. |
| | 8 | −58.20752 | 1.50000 | 55.50 | 1.69680 |
| | 9 | 45.96319 | 3.59112 | 25.40 | 1.80518 |
| | 10 | 5835.31044 | $l_2 = 38.75193$ | | 1. |
| 3 | 11 | 117.01736 | 5.46909 | 48.90 | 1.53172 |
| | 12 | −34.67070 | 2.40000 | 25.40 | 1.80518 |
| | 13 | −63.11394 | $l_3 = 27.21170$ | | 1. |
| 4 | 14 | 36.46918 | 4.00000 | 56.90 | 1.64100 |
| | 15 | 86.68257 | 1.00000 | | 1. |
| | 16 | 58.40588 | 2.50000 | 25.40 | 1.80518 |
| | 17 | 28.51184 | 2.95989 | 35.30 | 1.59270 |
| | 18 | 71.01742 | 35.25631 | | 1. |
| | 19 | 127.66903 | 3.50000 | 56.80 | 1.51602 |
| | 20 | −108.37253 | 2.46855 | | 1. |
| | 21 | −29.05086 | 1.500000 | 49.60 | 1.77250 |
| | 22 | 251.80093 | 3.85319 | 33.80 | 1.64769 |
| | 23 | −61.00145 | | | |

| | f = 100 | f = 200 | f = 300 |
|---|---|---|---|
| $l_1$ | 5.3717 | 47.3717 | 61.3717 |
| $l_2$ | 38.7519 | 19.7043 | 0.6567 |
| $l_3$ | 27.2117 | 4.2593 | 9.3069 |

EXAMPLE 5

Focal Length f = 100–300  F-number = 5.6

| | No. | R | D | ν | Nd |
|---|---|---|---|---|---|
| 1 | 1 | 140.38353 | 3.00000 | 25.40 | 1.80518 |
| | 2 | 79.09396 | 7.00000 | 61.10 | 1.58913 |
| | 3 | 1630.32675 | 0.2000 | | 1. |
| | 4 | 110.24910 | 5.00000 | 64.10 | 1.51633 |
| | 5 | 1.16312D + 05 | $l_1 = 5.42330$ | | 1. |
| 2 | 6 | −428.77850 | 1.500000 | 55.50 | 1.69680 |
| | 7 | 51.92710 | 3.33372 | | 1. |
| | 8 | −60.71653 | 1.50000 | 55.50 | 1.69680 |
| | 9 | 45.23708 | 3.59112 | 25.40 | 1.80518 |
| | 10 | 2035.53924 | $l_2 = 38.76331$ | | 1. |
| 3 | 11 | 117.04914 | 5.46909 | 48.90 | 1.53172 |
| | 12 | −34.67804 | 2.40000 | 25.40 | 1.80518 |
| | 13 | −63.11608 | $l_3 = 27.21170$ | | 1. |
| 4 | 14 | 36.80057 | 4.00000 | 56.40 | 1.61375 |
| | 15 | 106.71529 | 1.00000 | | 1. |
| | 16 | 65.77320 | 2.50000 | 23.90 | 1.84666 |
| | 17 | 36.82575 | 3.95989 | 35.30 | 1.59270 |
| | 18 | 63.63947 | 33.85736 | | 1. |
| | 19 | 137.63260 | 3.50000 | 60.70 | 1.60311 |
| | 20 | −108.04972 | 2.51287 | | 1. |
| | 21 | −30.19297 | 1.50000 | 49.60 | 1.77250 |

EXAMPLE 5-continued

| | Focal Length f = 100–300 F-number = 5.6 | | | |
|---|---|---|---|---|
| No. | R | D | ν | Nd |
| 22 | 273.98035 | 3.85319 | 33.80 | 1.64769 |
| 23 | −65.66392 | | | |

| | f = 100 | f = 200 | f = 300 |
|---|---|---|---|
| $l_1$ | 5.4233 | 47.4233 | 61.4233 |
| $l_2$ | 38.7633 | 19.7157 | 0.6681 |
| $l_3$ | 27.2117 | 4.2593 | 9.3069 |

EXAMPLE 6

| | | Focal Length f = 100–300 F-number = 5.6 | | | |
|---|---|---|---|---|---|
| | No. | R | D | ν | Nd |
| 1 | 1 | 141.55570 | 3.00000 | 25.40 | 1.80518 |
| | 2 | 79.69741 | 7.00000 | 61.10 | 1.58913 |
| | 3 | 1799.49036 | 0.20000 | | 1. |
| | 4 | 109.77155 | 5.00000 | 64.10 | 1.51633 |
| | 5 | 15889.36029 | $l_1$ = 5.36452 | | 1. |
| 2 | 6 | −802.13188 | 1.50000 | 55.50 | 1.69680 |
| | 7 | 50.31003 | 3.43431 | | 1. |
| | 8 | −57.55507 | 1.50000 | 55.50 | 1.69680 |
| | 9 | 46.47856 | 3.59112 | 25.40 | 1.80518 |
| | 10 | 17995.27833 | $l_2$ = 38.70304 | | 1. |
| 3 | 11 | 120.31193 | 5.46909 | 48.90 | 1.53172 |
| | 12 | −35.76971 | 2.40000 | 25.40 | 1.80518 |
| | 13 | −63.69167 | $l_3$ = 27.21170 | | 1. |
| 4 | 14 | 36.05473 | 4.00000 | 56.40 | 1.61375 |
| | 15 | 73.18103 | 1.00000 | | 1. |
| | 16 | 50.464504 | 2.50000 | 25.40 | 1.80518 |
| | 17 | 22.82266 | 5.00000 | 33.80 | 1.64769 |
| | 18 | 65.29793 | 37.49417 | | 1. |
| | 19 | 181.98705 | 3.50000 | 60.70 | 1.60311 |
| | 20 | −134.91768 | 2.71899 | | 1. |
| | 21 | −29.32542 | 1.50000 | 49.60 | 1.77250 |
| | 22 | 197.58324 | 3.85319 | 33.80 | 1.64769 |
| | 23 | −55.54766 | | | |

| | f = 100 | f = 200 | f = 300 |
|---|---|---|---|
| $l_1$ | 5.3645 | 47.3645 | 61.3645 |
| $l_2$ | 38.7030 | 19.6554 | 0.6078 |
| $l_3$ | 27.2117 | 4.2593 | 9.3069 |

TABLE 1

Aberration Coefficients
f = 100.0

| No. | SA | CM | AS | PT | DS |
|---|---|---|---|---|---|
| 1 | 0.089724 | 0.071058 | 0.056275 | 0.318218 | 0.296583 |
| 2 | −0.161536 | −0.000178 | −0.000000 | −0.095724 | −0.000106 |
| 3 | 0.009767 | −0.045650 | 0.213359 | −0.012992 | −0.936485 |
| 4 | 0.013857 | 0.015981 | 0.018431 | 0.308237 | 0.376741 |
| 5 | 0.215386 | −0.417095 | 0.807704 | −0.000572 | −1.563010 |
| 6 | −0.367732 | 0.621432 | −1.050161 | −0.065159 | 1.884785 |
| 7 | −4.612988 | −0.054985 | −0.000655 | −0.822203 | −0.009808 |
| 8 | 0.001054 | −0.001493 | 0.002113 | −0.749098 | 1.057562 |
| 9 | 3.658503 | −0.692320 | 0.131012 | 0.076176 | −0.039207 |
| 10 | −2.339188 | −0.732396 | −0.229312 | 0.021349 | −0.065113 |
| 11 | 14.142472 | 1.545163 | 0.168820 | 0.274583 | 0.048445 |
| 12 | −19.587051 | 3.999035 | −0.816472 | −0.297883 | 0.227515 |
| 13 | 8.220811 | −2.688776 | 0.879417 | 0.753598 | −0.534109 |
| 14 | 38.894638 | 5.139327 | 0.679083 | 1.095870 | 0.234533 |
| 15 | 0.053182 | 0.141937 | 0.378814 | −0.472379 | −0.249713 |
| 16 | −0.729172 | −0.503962 | −0.348310 | 0.769191 | 0.290889 |
| 17 | −4.854302 | −0.679860 | −0.095217 | −0.260216 | −0.049779 |
| 18 | 0.199643 | 0.248200 | 0.308566 | −0.542328 | −0.290616 |
| 19 | −0.485855 | −0.490812 | −0.495819 | 0.262561 | 0.235638 |
| 20 | 13.488955 | −0.777767 | 0.044846 | 0.319170 | −0.020989 |
| 21 | −48.341919 | −5.516010 | −0.629399 | −1.508201 | −0.243909 |
| 22 | −0.001406 | −0.004266 | −0.012940 | −0.018813 | −0.096323 |
| 23 | 4.271517 | −0.529122 | 0.065544 | 0.663059 | −0.090254 |
| 1–23 | 1.778356 | −0.370933 | 0.075698 | 0.016445 | 0.463267 |

TABLE 2 f = 20.0

| No. | SA | CM | AS | PT | DS |
|---|---|---|---|---|---|
| 1 | 1.435588 | −0.076496 | 0.004076 | 0.318218 | −0.017174 |
| 2 | −2.584577 | 0.648726 | −0.162830 | −0.095724 | 0.064897 |
| 3 | 0.156272 | −0.221865 | 0.314990 | −0.012992 | −0.428758 |
| 4 | 0.221717 | 0.008214 | 0.000304 | 0.308237 | 0.011430 |
| 5 | 3.446175 | −2.534315 | 1.863734 | −0.000572 | −1.370169 |
| 6 | −3.425593 | 2.295929 | −1.538796 | −0.065159 | 0.075016 |
| 7 | −7.370132 | −0.951773 | −0.122911 | −0.822203 | −0.122051 |
| 8 | −1.351243 | 0.794790 | −0.467489 | −0.749098 | 0.715587 |
| 9 | 8.280140 | −0.146648 | 0.002597 | 0.076176 | −0.001395 |
| 10 | −2.969935 | −1.185270 | −0.473029 | 0.021349 | −0.180261 |
| 11 | 14.142469 | 2.758587 | 0.538082 | 0.274583 | 0.158516 |
| 12 | −19.587051 | 2.318465 | −0.274430 | 0.297883 | 0.067743 |
| 13 | 8.220809 | −1.983431 | 0.478541 | 0.753598 | −0.297278 |
| 14 | 38.894653 | 5.139327 | 0.679083 | 1.095870 | 0.234533 |
| 15 | 0.053182 | 0.141937 | 0.378814 | −0.472379 | −0.249713 |
| 16 | −0.729172 | −0.503962 | −0.348309 | 0.769191 | 0.290889 |
| 17 | −4.854303 | −0.697860 | −0.095217 | −0.260216 | −0.049779 |
| 18 | 0.199644 | 0.248200 | 0.308566 | −0.542328 | −0.290616 |
| 19 | −0.485855 | 0.490812 | −0.495819 | 0.262561 | 0.235638 |
| 20 | 13.488956 | −0.777767 | 0.044846 | 0.319170 | −0.020989 |

TABLE 2-continued f = 20.0

| No. | SA | CM | AS | PT | DS |
|---|---|---|---|---|---|
| 21 | −48.341919 | −5.516010 | −0.629399 | −1.508201 | −0.243909 |
| 22 | −0.001406 | −0.004266 | −0.012940 | −0.018813 | −0.096323 |
| 23 | 4.271518 | −0.529122 0.065544 | 0.663059 | −0.090254 | |
| 1–23 | 1.109921 | −0.265798 | 0.058008 | 0.016445 | −0.604420 |

TABLE 3 f = 300.0

| No. | SA | CM | AS | PT | DS |
|---|---|---|---|---|---|
| 1 | 7.267665 | −0.579111 | 0.046145 | 0.318218 | −0.029034 |
| 2 | −13.084419 | 2.192374 | −0.367346 | −0.095724 | 0.077590 |
| 3 | 0.791129 | −0.543501 | 0.373382 | −0.012992 | −0.247587 |
| 4 | 1.122443 | −0.044377 | 0.001754 | 0.308237 | −0.012256 |
| 5 | 17.446259 | −6.679216 | 2.557106 | −0.000572 | −0.978757 |
| 6 | −13.791801 | 4.872882 | −1.721673 | −0.065159 | 0.631319 |
| 7 | −10.747814 | −1.454854 | −0.196933 | −0.822203 | −0.137953 |
| 8 | −6.890603 | 2.166642 | −0.681267 | −0.749098 | 0.449756 |
| 9 | 16.251175 | 0.377796 | 0.008783 | 0.076176 | 0.001975 |
| 10 | −3.571770 | −1.358757 | −0.516892 | 0.021349 | −0.188513 |
| 11 | 14.142469 | 2.491735 | 0.439014 | 0.274583 | 0.125727 |
| 12 | −19.587051 | 2.688051 | −0.368898 | −0.297883 | 0.091506 |
| 13 | 8.220809 | −2.138548 | 0.556318 | 0.753598 | −0.340760 |
| 14 | 38.894638 | 5.139327 | 0.679083 | 1.095870 | 0.234533 |
| 15 | 0.053182 | 0.141937 | 0.378814 | −0.472379 | −0.249713 |
| 16 | −0.729172 | −0.503962 | −0.348309 | 0.769191 | 0.290889 |
| 17 | −4.854302 | −0.679860 | −0.095217 | −0.260216 | −0.049779 |
| 18 | 0.199644 | 0.248200 | 0.308566 | −0.542328 | −0.290616 |
| 19 | −0.485855 | 0.490812 | −0.495819 | 0.262561 | 0.235638 |
| 20 | 13.488955 | −0.777767 | 0.044846 | 0.319170 | −0.020989 |
| 21 | −48.341919 | −5.516010 | −0.629399 | −1.508201 | −0.243909 |
| 22 | −0.001406 | −0.004266 | −0.012940 | −0.018813 | −0.096323 |
| 23 | 4.271518 | −0.529122 | 0.065544 | 0.663059 | −0.090254 |
| 1–23 | 0.063775 | 0.000403 | 0.024662 | 0.016445 | −0.837508 |

What is claimed is:

1. A zoom lens of short total length comprising: four component lens groups:
   the first lens group being of positive refractive power and movable along an optical axis to effect focusing;
   the second lens group being of negative refractive power and movable along the optical axis to effect zooming;
   the third lens group being of positive refractive power and movable along the optical axis together with said second lens group to maintain an image plane at a constant position during zooming;
   the fourth lens group being of positive refractive power and fixed; said fourth lens group including front and rear subgroups;
   said front subgroup consists of, in order from the object end, a first component of positive refractive power with a convex surface of the strongest refractive power among said front subgroup disposed on the object end, a second component having a lens of negative refractive power with a convex surface disposed on the object end and a meniscus lens of positive refractive power and composed of two lenses cemented together;
   said rear subgroup including a first component of positive refractive power and a cemented meniscus component with a concave surface disposed on the object side; and
   assuming that the focal length of the fourth lens group is, $F_R$, the composite focal length of the first component and the second component of the front subgroup is $F_{I-II}$, and the radius of curvature of the cemented surface of the meniscus lens of the front subgroup is $rR_4$, the following relations prevail:

$$0.65 < F_{I-II}/F_R < 0.71 \quad (1)$$

$$0.14\, F_R < r_{R4} < 0.24\, F_R \quad (2)$$

2. A zoom lens according to claim 1, wherein the following conditions are satisfied:

$$0.15 < n_{R2} - n_{R3} < 0.26 \quad (3)$$

$$1.5 < N_{R1} < 1.65;\ 1.5 < n_{R4} < 1.65 \quad (4)$$

where $n_{Ri}$ represents the refractive index of a glass material forming the i-th lens from the object end within the fourth lens group.

* * * * *